United States Patent
Terada

(10) Patent No.: US 7,458,032 B2
(45) Date of Patent: Nov. 25, 2008

(54) DISPLAY CONTROL METHOD AND DISPLAY CONTROL PROCESSING SYSTEM FOR CONCEALED WINDOW ON DESKTOP

(75) Inventor: Masahiro Terada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 533 days.

(21) Appl. No.: 10/255,695

(22) Filed: Sep. 27, 2002

(65) Prior Publication Data

US 2003/0076362 A1 Apr. 24, 2003

(30) Foreign Application Priority Data

Sep. 28, 2001 (JP) ............................. 2001-302394

(51) Int. Cl.
*G06F 3/00* (2006.01)
(52) U.S. Cl. ........................ 715/769; 715/773
(58) Field of Classification Search ................ 715/781, 715/769, 794, 835
See application file for complete search history.

(56) References Cited

U.S. PATENT DOCUMENTS

| 5,608,860 A * | 3/1997 | Fitzpatrick et al. .......... 715/826 |
| 5,668,890 A * | 9/1997 | Winkelman ................. 382/167 |
| 5,668,960 A * | 9/1997 | Kataoka .................... 345/637 |
| 5,745,112 A * | 4/1998 | Hirose ...................... 715/769 |
| 5,825,360 A * | 10/1998 | Odam et al. ................ 715/807 |
| 5,859,639 A * | 1/1999 | Ebrahim ..................... 715/788 |
| 5,999,178 A * | 12/1999 | Hwang et al. ............... 715/787 |
| 6,047,312 A * | 4/2000 | Brooks et al. ............... 709/203 |
| 6,307,545 B1 * | 10/2001 | Conrad et al. ............... 715/781 |
| 6,628,309 B1 * | 9/2003 | Dodson et al. .............. 715/769 |
| 6,915,490 B1 * | 7/2005 | Ewing ....................... 715/794 |
| 2003/0197739 A1 * | 10/2003 | Bauer ........................ 345/800 |
| 2003/0222915 A1 * | 12/2003 | Marion et al. ............... 345/769 |
| 2005/0198585 A1 * | 9/2005 | Haynes ....................... 715/781 |

FOREIGN PATENT DOCUMENTS

| EP | 548709 A2 * | 6/1993 |
| JP | 62-269283 A | 11/1987 |
| JP | 7-72858 B2 | 8/1995 |
| JP | 9-6582 A | 1/1997 |

* cited by examiner

*Primary Examiner*—David Wiley
*Assistant Examiner*—Ryan Pitaro
(74) *Attorney, Agent, or Firm*—Birch, Stewart, Kolasch & Birch, LLP

(57) ABSTRACT

The object of the present invention is to make it possible to drop easily an object in a window as a destination of drop by an operator even if the window as the destination of drop is concealed on the desktop before start of the drag. When an object 22 displayed in a window 21 is dragged by a pointing device and then dropped in another window 23, start of a drag operation is detected, and the window 23 that corresponds to an application as a destination of drop of the dragged object 22 is displayed on a foremost side of a multi-window environment to activate.

18 Claims, 10 Drawing Sheets

FIG. 7A

| APPLICATION | | OBJECT TYPE | | |
|---|---|---|---|---|
| | | α | β | γ |
| A | MODE 1 | APPLICATION E | APPLICATION F | – |
| | MODE 2 | APPLICATION E | APPLICATION G | – |
| B | MODE 1 | APPLICATION H | APPLICATION J | APPLICATION K |
| | MODE 2 | APPLICATION L | APPLICATION J | APPLICATION M |
| | MODE 3 | APPLICATION N | APPLICATION P | – |

FIG. 7B

| APPLICATION A/MODE 1 | | |
|---|---|---|
| PRIORITY | α | β |
| 1 | APPLICATION E | APPLICATION F |
| 2 | APPLICATION F | APPLICATION G |
| 3 | APPLICATION G | APPLICATION E |
| 4 | APPLICATION Q | – |

DISPLAY CONTROL METHOD AND DISPLAY CONTROL PROCESSING SYSTEM FOR CONCEALED WINDOW ON DESKTOP

This nonprovisional application claims priority under 35 U.S.C. § 119 (a) on Patent Application No. 2001-302394 filed in JAPAN on Sep. 28, 2001, which is herein incorporated by reference.

BACKGROUND OF THE INVENTION

1. Field of the Invention

The present invention relates to a window display of an application software and, more particularly, control of operability about a display control method and a display control processing system for a concealed window on a desktop, in which the operability of the drag-and-drop operation is improved.

2. Description of the Related Art

In the multitask window environment (also mentioned as "multi-window environment"), the drag-and-drop operation is normally utilized to execute moving, copying, transferring, etc. of the file.

For example, in the situation that the window A indicating a file list of any folders and the window B indicating a file list of different folders are displayed on the desktop, a file in the window A can be moved or copied by dragging an icon of the file using the pointing device and then dropping the icon within the window B. When this drag-and-drop operation is to be executed, sometimes there is the case where, as shown in FIG. 8A, most part of the window in which the icon is to be dropped is concealed by the window from which the icon is dragged or other window, or the case where, as shown in FIG. 8B, the window is completely concealed, for example. In such case, as shown from A to B of FIG. 9, for example, the display size of the window 61 as the origin of drag is reduced to display the window 62 as the destination of drop on the desktop, and then the drag-and-drop operation must be started. Thus, there is the problem that the operation becomes complicated.

Also, in the situation that the window C indicating a file list of any folders and the icon D indicating a link to the executable file of any application D, both of the window C and the icon D are displayed on the desktop, the application D can be started to transfer a file in the window C to the application D by dragging an icon of the file using the pointing device and then dropping the icon of the file on the icon D. When this drag-and-drop operation is to be carried out, there is the problem such that, if the icon D is concealed by the window C, from which the icon is dragged, or other window, the operation becomes complicated. In addition, according to this drag-and-drop operation, if the icon of the target application D is not present on the desktop or if the operator forgot which application is the target application itself, either the target application must be started by another method or the target application must be searched and then started, and then the drag-and-drop operation must be carried out. Thus, there is the problem that the operation becomes complicated.

Also, there have been proposed various technologies that can cause any window to display explicitly or implicitly on the foremost side of the desktop and to activate the window in the situation that a plurality of windows are opened but overlapped or concealed. However, since these technologies can activate any one window only, the above problems in the drag-and-drop operation cannot be overcome yet. More particularly, such technologies are effective to display the window, which is subjected to the drag, on the foremost side and activate such window, but they are not effective to display the window as the destination of drop in the area of the desktop other than the window as the origin of drag. Therefore, the operation for changing the position of the window as the destination of drop is needed like the above problems, and thus the problem such that procedures are complicated cannot be overcome yet.

SUMMARY OF THE INVENTION

Therefore, the present invention has been made in view of above circumstances, and it is an object of the present invention to provide a display control method and a display control processing system for displaying a concealed window on a desktop, by which an operator can drop easily an object in a window as a destination of drop even if the window as the destination of drop is concealed on the desktop prior to start of the drag.

Also, it is another object of the present invention to provide a display control method and a display control processing system for displaying a concealed window on a desktop, by which the operator can execute easily the drop of the object even if an application that receives the drag is not started at a point of time when the drag is started.

In addition, it is still another object of the present invention to provide a display control method and a is display control processing system for displaying a concealed window on a desktop, by which the operator can decide easily the destination of drop of the object even if a plurality of applications that can receive the drag are present.

A display control method set forth in Claim 1 of the present invention, for a concealed window on a desktop when any object displayed in one window in a multitask window environment is dragged by a pointing device and then dropped in another window, the method includes a step of detecting start of a drag operation (S101); and a step of displaying a window, which corresponds to a predetermined application as a destination of drop of a dragged object, on a foremost side of a multi-window environment to activate (S107).

A display control method set forth in Claim 2, for displaying a concealed window on a desktop when any object displayed in one window in a multitask window environment is dragged by a pointing device and then dropped in another window, the method includes a step of detecting start of a drag operation (S101); a step of detecting whether or not a predetermined application as a destination of drop of a dragged object has been started (S103); and a step of displaying a concerned window on a foremost side of a multi-window environment to activate (S105) if the predetermined application has been started, or starting the application and then displaying the concerned window on the foremost side of the multi-window environment to activate (S107) if the predetermined application has not been started.

A display control method further includes a step of displaying a window of an application on the foremost side of the multi-window environment to activate (S107) by referring to a table that indicates association between objects and applications and priorities of the applications (S102) if a plurality of applications that are the destination of drop of the object are present.

A display control method set forth in Claims 3 or 4, further comprises a step of displaying windows of a plurality of applications sequentially on the foremost side of the multi-window environment in compliance with the priorities in a reference table to activate during when the drag operation is held, and then repeating a circulation of activation until a drop operation is carried out (FIG. 6).

A display control processing system set forth in Claim 7, for displaying a concealed window on a desktop when any object displayed in one window in a multitask window environment is dragged by a pointing device and then dropped in another window, comprises a control means (CPU 2) for detecting start of a drag operation, and then displaying a window, which corresponds to a predetermined application as a destination of drop of a dragged object, on a foremost side of a multi-window environment to activate.

A display control processing system set forth in Claim 8, for displaying a concealed window on a desktop when any object displayed in one window in a multitask window environment is dragged by a pointing device and then dropped in another window, comprises a control means (CPU 2) for detecting start of a drag operation, and then displaying a concerned window on a foremost side of a multi-window environment to activate if a predetermined application as a destination of drop of a dragged object has been started, or starting the application and then displaying the concerned window on the foremost side of the multi-window environment to activate if the predetermined application has not been started.

A display control processing system, further comprises a reference table (FIG. 7) in which association between a plurality of applications, which are the destination of drop of the object, and objects and priorities of applications are set and which is used to display a window of an application on the foremost side of the multi-window environment to activate by referring to the association and the priorities.

In a display control processing system set forth in Claims 9 or 10, the control means displays windows of a plurality of applications sequentially on the foremost side of the multi-window environment in compliance with priorities in the reference table to activate during when the drag operation is held, and then repeats a circulation of activation until a drop operation is carried out.

A program set forth in Claim 13, for displaying/controlling a concealed window on a desktop when any object displayed in one window in a multitask window environment is dragged by a pointing device and then dropped in another window, the program causes a computer to function as a control means that detects start of a drag operation, and then displays a window, which corresponds to a predetermined application as a destination of drop of a dragged object, on a foremost side of a multi-window environment to activate.

A program set forth in Claim 14, for displaying/controlling a concealed window on a desktop when any object displayed in one window in a multitask window environment is dragged by a pointing device and then dropped in another window, the program causes a computer to function as a control means that detects start of a drag operation, and then displays a concerned window on a foremost side of a multi-window environment to activate if a predetermined application as a destination of drop of a dragged object has been started, or starts the application and then displays the concerned window on the foremost side of the multi-window environment to activate if the predetermined application has not been started.

In a program, the program causes the control means to function as a look-up means in which association between a plurality of applications, that are the destination of drop of the object, and objects and priorities of the applications are set and which is used to display a window of an application on the foremost side of the multi-window environment to activate by referring to the association and the priorities.

In a program set forth in Claim 15, the program causes the control means to display windows of a plurality of applications sequentially on the foremost side of the multi-window environment in compliance with priorities in a reference table to activate during when the drag operation is held, and then repeat a circulation of activation until a drop operation is carried out.

According to the inventions set forth in Claims 1, 7, and 13, even if the window as the destination of drop is concealed on the desktop prior to the start of the drag, the window of the application, which receives the drag, can be displayed on the foremost side of the desktop at a point of time when the drag is started. Thus, the operator can drop easily the object in the window as the destination of drop.

Also, according to the inventions set forth in Claims 2, 8, and 14, if the application that receives the drag is not started at a point of time when the drag is started, the concerned application can be started automatically and also the window can be displayed on the foremost side. Thus, the operator can drop easily the object not to execute newly the starting operation of the application.

Also, according to the inventions set forth in, if a plurality of applications that can receive the drag are present, the concerned application can be displayed on the foremost side or can be started and then displayed on the foremost side by referring to the table that indicates the association between the objects and the applications and priorities of the applications. Thus, the operator can decide easily the destination of drop of the object.

Also, according to the inventions set forth in Claims 3 to 4, 9 to 10, and 15 to 16, if a plurality of applications that can receive the drag are present, the window that is to be displayed on the foremost side can be altered/circulated sequentially in compliance with the priority in the reference table until the drop operation is carried out. Thus, the operator can select easily the destination of drop of the object.

BRIEF DESCRIPTION OF THE DRAWINGS

FIGS. 7A and 7B are conceptual views showing structural examples of a reference table;

Figure 1:
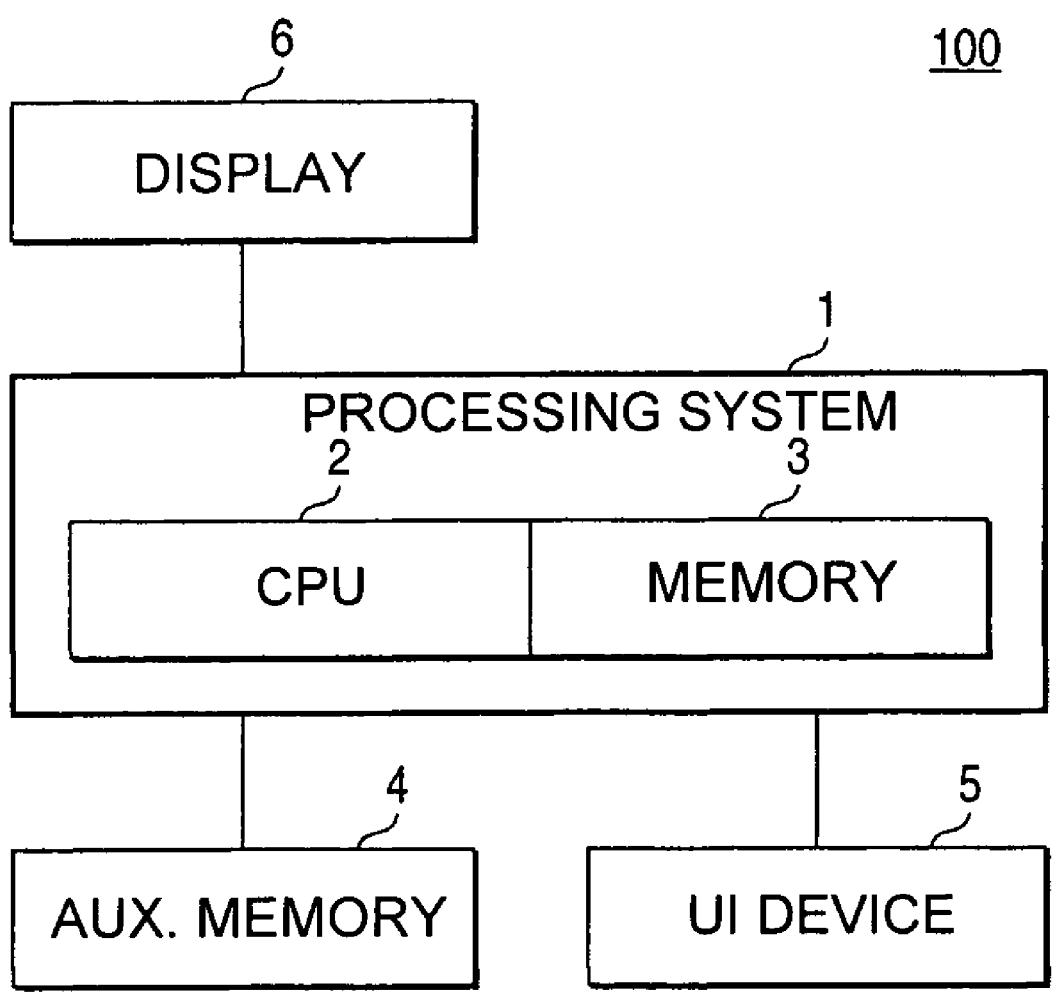
FIG. 1 is a block diagram showing a data processing system according to an embodiment of the present invention.

In the figures, reference numeral 1 refers to a processing system; 2 to a CPU; 3 to a memory; 4 to an auxiliary memory; 5 to a pointing device; 6 to a display; each of 20, 30, and 40 to a desktop; each of 22, 32, and 42 to an icon; each of 21, 23, and 24 to a window; 31 and 33 to windows; each of 41, 42, 44, and 45 to a window; and 100 to a data processing system.

DETAILED DESCRIPTION OF THE PREFERRED EMBODIMENTS

An embodiment of a display control method and a display control processing system for a concealed window on a desktop according to the present invention will be explained with reference to the drawings hereinafter.

FIG. 1 is a block diagram showing a data processing system according to the present invention. This data processing system 100 comprises a processing system 1, and the processing system 1 includes a central processing unit (CPU) 2 and a memory 3. An auxiliary memory 4 is connected to the processing system 1, and codes, etc. of the program for embodying the present invention are recorded. Also, this data processing system 100 has a user interface device 5 such as a pointing device and a display 6, etc.

Figure 2A:
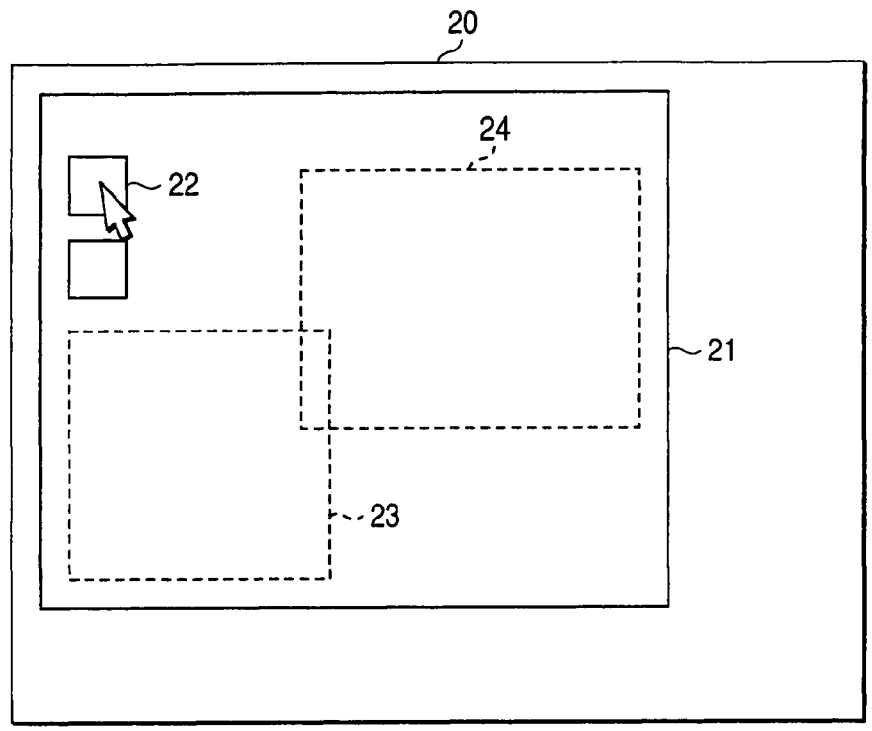
FIGS. 2A and 2B are schematic views showing an example of desktop display according to the embodiment of the present invention (an example in which a window of the application that has already been started and concealed is displayed on the foremost side of the desktop)
Figure 2B:
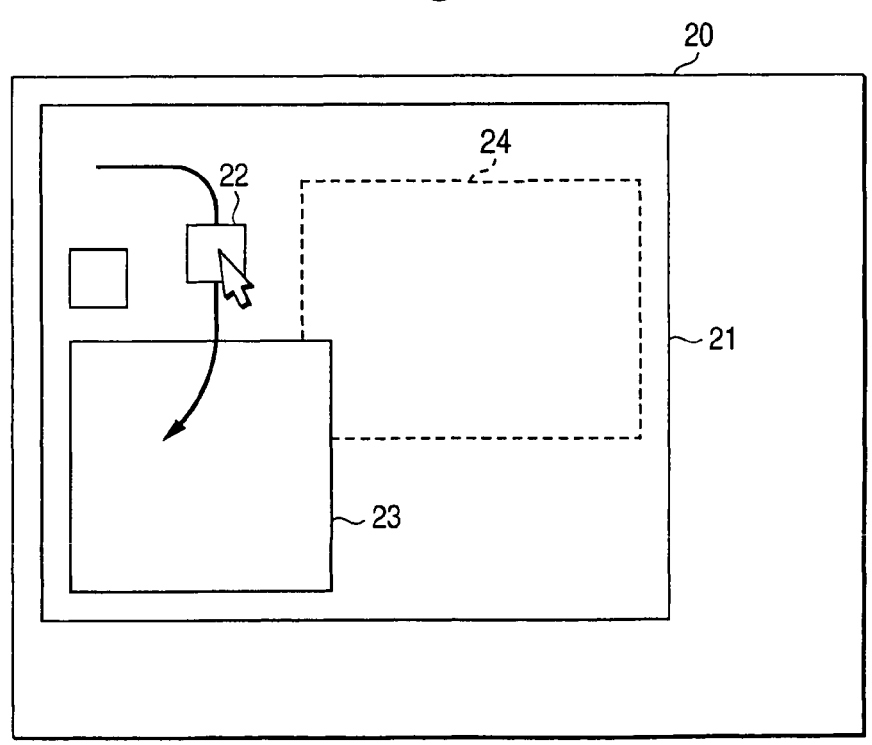
Figure 3A:
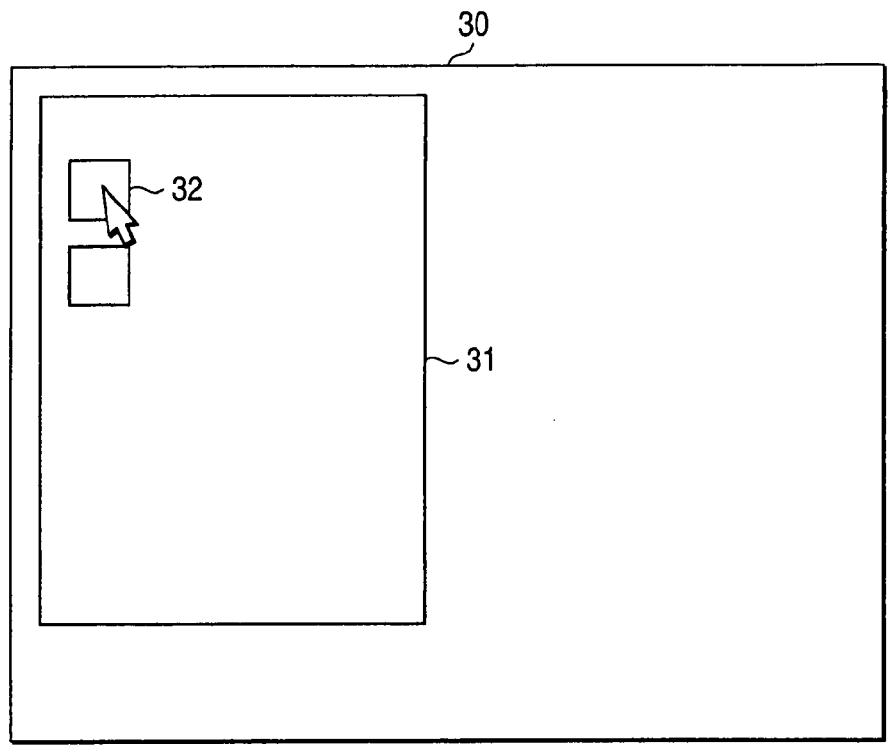
FIGS. 3A and 3B are schematic views showing an example of desktop display according to the embodiment of the present invention (an example in which an application is started and a window is displayed on the foremost side of the desktop)
Figure 3B:
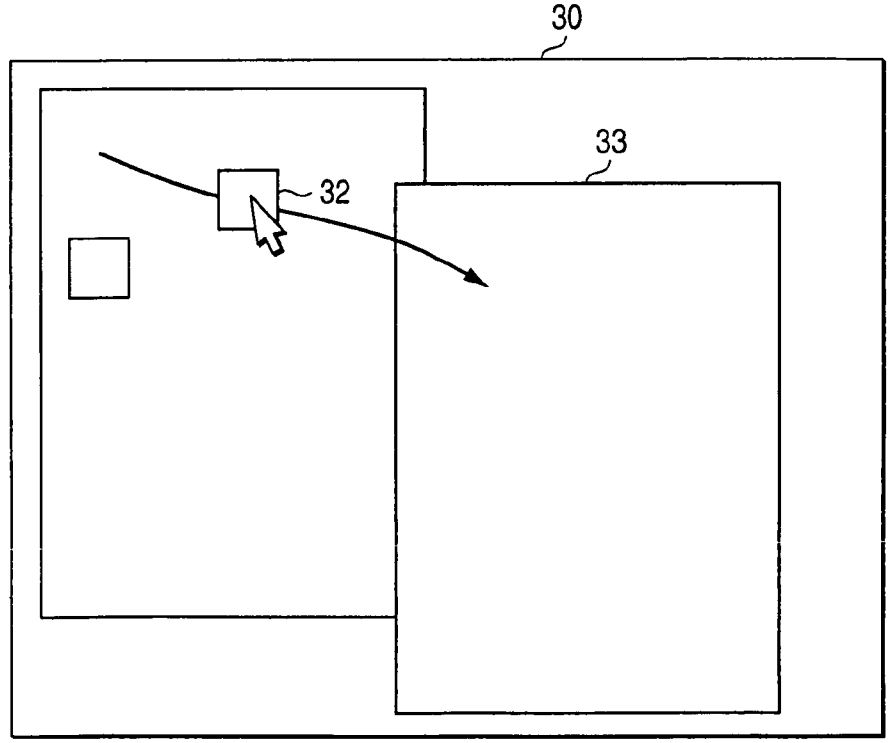
Figure 4A:
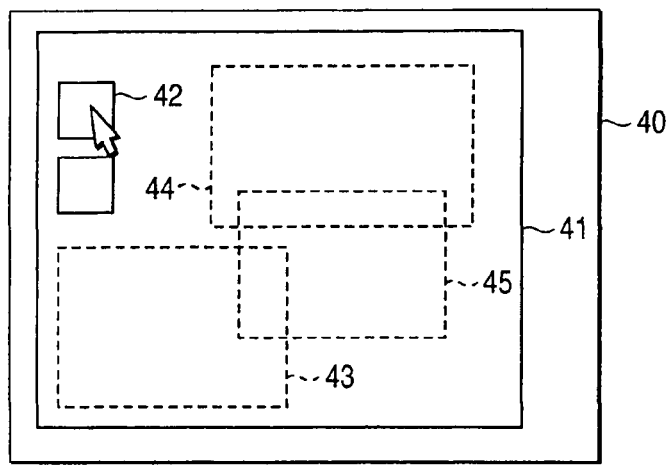
FIGS. 4A, 4B, 4C, and 4D are schematic views showing an example of desktop display according to the embodiment of the present invention (an example in which windows of plural applications as the destination of drop are displayed sequentially on the foremost side of the desktop)
Figure 4B:
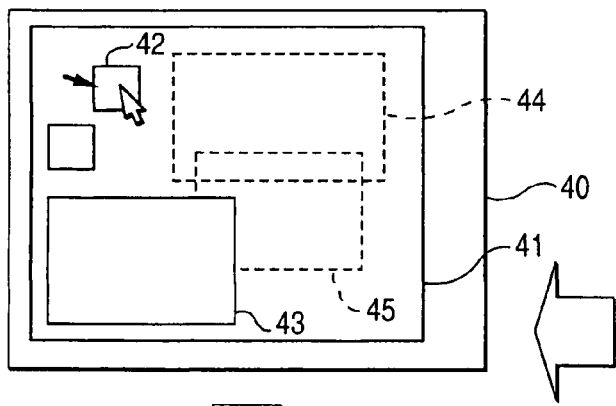
Figure 4D:
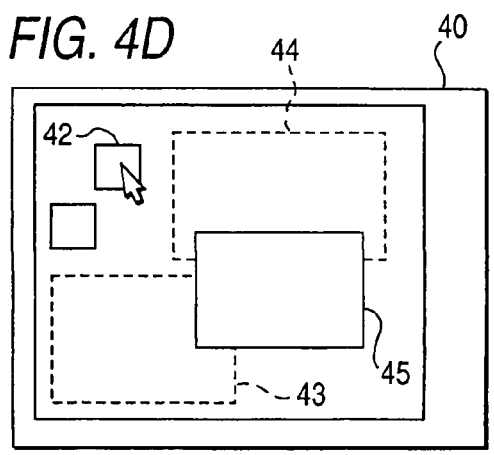
Figure 4C:
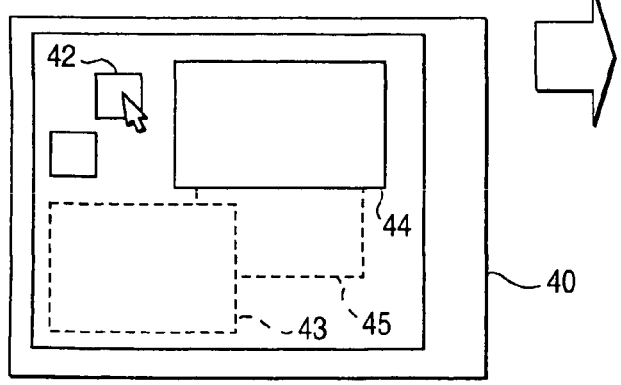

FIG. 2, FIG. 3 and FIG. 4 show an example of display about the drag-and-drop operation respectively. According to the present invention, even if the window of the application as the destination of drop is concealed, such window can be displayed on the foremost side of the desktop when the drag of the object is started in the window as the origin of drag. FIG. 2 shows this state of the desktop. A window F (23) of an application F and a window G (24) of an application G are concealed under a window E (21) on a desktop 20. However, the window F (23) of an application F that is recognized as the destination of drag is displayed on the foremost side of the desktop at a point of time when an icon 22 of an object in the window E (21) is dragged. Accordingly, if the icon 22 of the object is dragged into the window F (23), the drag-and-drop operation can be completed.

Also, according to the present invention, if the application serving as the destination of drop is not started, such application is started and then displayed on the foremost side of the desktop. FIG. 3 shows this state of the desktop. Although an application J serving as the destination of drop of a window H (31) on a desktop 30 is not started, the application J that is recognized as the destination of drag is started at a point of time when an icon 32 of the object of the window H (31) is dragged, and then a window J (33) is displayed on the foremost side of the desktop. Accordingly, if the icon 32 of the object is dragged into the window J (33), the drag-and-drop operation can be completed.

In addition, according to the present invention, if a plurality of applications are present as the destination of drop, the window of the application is displayed or started and then displayed on the foremost side of the desktop in compliance with a table, in which the objects and the applications are correlated mutually, and is activated. At this time, if the dragged object is kept while being dragged without drop, the windows of the applications, which are correlated with the object, are activated sequentially at a predetermined time interval according to the priority after a predetermined time has lapsed, and then this operation is circulated. FIG. 4 shows this state of the desktop. As the destination of drop of the object in a window K (41) of a desktop 40, applications L, M, N are registered in a reference table in this order of priority. These three applications have already been started, and also a window L (43), a window M (44), and a window N (45) are concealed by a window K (41). However, the window L (43) of the application L, which is recognized as the destination of drag having the first priority, is displayed on the foremost side of the desktop 40 at a point of time when an icon 42 of the object of the window K (41) is dragged.

If the moving of the icon 42 that starts the drag is stopped to keep the drag operation as it is, the window M (44) having the second priority is displayed on the foremost side instead of the window L (43) after a predetermined time has lapsed. Similarly, if the drag operation is kept as it is, the window N (45) having the third priority is displayed on the foremost side instead of the window M (44) at this time after the predetermined time has lapsed. If this state is still kept as it is, the display is returned to the start at this time after the predetermined time has lapsed, and then the window L (43) having the first priority is displayed once again on the foremost side instead of the window N (45). When the application that has been registered on the table is not started, the process of skipping such application may be set, otherwise the process of starting such application and then displaying it on the foremost side may be set. Accordingly, if the icon 42 of the object is dragged into the window at a point of time when the desired window is displayed, the drag-and-drop operation can be completed.

Next, an operation of a display control method of the present invention will be explained in compliance with flowcharts shown in FIG. 5 and FIG. 6. First, if the operator starts to drag the object (icon, or the like) of any window by using the pointing device 5 while looking at the screen of the display 6, the CPU 1 in the processing system 1 detects the drag operation (step S101). The CPU can grasp the application of the window as the origin of drag, its operating state (operation mode), the type of the dragged object, etc.

Then, the previously-prepared table is looked up to assign the corresponding application to the object (step S102). In the reference table, corresponding applications are assigned in response to the operation mode of the application and the type of the object. Also, if the priorities are affixed to the corresponding applications, a plurality of applications can be assigned to the same mode or the same object.

Here, a structure of the reference table will be explained. FIG. 7 are conceptual views showing structural examples of the structure of the reference table. As shown in FIG. 7A, the corresponding application is assigned to the table every operation mode of the application and every type of the object.

For example, the case where the application A is an application of the image editing process and also the corresponding applications are classified according to two operation modes, i.e., an image editing mode (mode 1) and a text editing mode (mode 2), and two type data of the selected object, i.e., image data ($\alpha$) and sound data ($\beta$), will be explained. When the operator starts the drag operation by clicking the icon indicating the data file in the window of the application A, such operator can look up the table in FIG. 7.

If the window that receives the drag operation is the window of the application A, which is in the image editing mode (mode 1), and the selected icon is the image data ($\alpha$), the window of the application E is displayed on the foremost side, as shown in the table. In contrast, if the window that receives the drag operation is the window of the application A, which is in the text editing mode (mode 2), and the selected icon is the sound data (β), the window of the application G is displayed on the foremost side of the desktop, as shown in the table. As described above, the window displayed on the foremost side can be altered according to the operation mode of the application as the origin of drag and the type of the dragged icon (type of the object).

In this case, the operation of displaying the concerned window on the foremost side is carried out if the application has already been started, while the operation of starting the concerned application and then displaying the window on the foremost side is carried out if the application has not been started yet. Also, the well-known approach may be employed as the method of displaying the concerned window among plural windows, which are being displayed on the desktop, on the foremost side.

The types of the operation mode and the object can be increased according to the situation. Also, a multi-dimensional table may be formulated by setting other classifying items in addition to the operation mode and the object. In addition, any window out of plural windows can be designated by designating the operation mode in the application as the destination of drag, and then displayed on the foremost side.

In addition, as shown in FIG. 7B, even when the same operation mode and the same object are selected, a plurality of corresponding applications with their priorities can be set. For example, the application E with the first priority to the application Q with the fourth priority are set as the application that corresponds to the application A, the mode 1, and the data α in FIG. 7A. Under such setting, if the window of the application, which is displayed on the foremost side at a point of time when the drag operation is started, is not the user's target application, the windows of the applications that can serve as the destination of drop are displayed sequentially on the foremost side. As a result, the desired application can be selected. The procedures of changing the window of the application that is to be displayed on the foremost side will be described later.

Then, returning to FIG. 5, the application as the destination of drop of the object is grasped by referring to the table (step S102). Then, it is decided whether or not the concerned application has already started (step S103). If such application is not started, it is decided in step S104 whether or not the application is to be started. For example, in the case that "only the application that has already been started is displayed on the foremost side" is set in the initialization, "NO" is decided here and no process is executed. In contrast, in the case that the application is to be started, the concerned application is started in step S105.

In the case that the application has already been started or the application is started, a window handle of the application is acquired in step S106 and thus the area on the screen, which is used to display the window on the foremost side, is assured. Then, the window of the application is displayed and activated in step S107.

In this case, if the application is displayed as the minimization display (for example, the icon display on the bottom portion of the screen) although such application has been started, such application is displayed in original display size on the foremost side.

In step S108, the CPU 2 decides whether or not the drop operation is detected. If the drop operation is detected, the CPU executes the process of transferring the object to the application of the concerned window (step S109). In contrast, if the CPU detects that the drop operation has not been executed, it executes the process of changing the application that is being displayed on the foremost side (step S110). If a predetermined time has lapsed while keeping the drag operation as it is without the drop operation, the CPU decides that the application that is currently window-displayed on the foremost side does not correspond to the application as the destination of drop. Then, the CPU executes the process of causing the window of another application, which can serve as the destination of drop, to display on the foremost side. This process can function only when the assignment of the priority of the application is present in the above reference table.

In this case, in the detection of the drop operation (step S108), the decision may be made after a predetermined time has been lapsed.

The details of the process of changing the application, which is to be displayed on the foremost side of the desktop, will be explained with reference to FIG. 6. First, the time count for measuring lapse of a predetermined time is started (step S201). The detection of the drop operation is executed during this counting (step S202). If the operation is detected, the drop process of the object is executed (step S203). It is decided in step S204 whether or not the predetermined time has lapsed. If the predetermined time has lapsed, the increment of the priority is executed (step S205), and then the concerned application in the table is looked up (step S206). If the explanation is made with reference to the data α in FIG. 7B, the window that is currently displayed on the foremost side is the window of the application E and the priority is No. 1. Then, the priority becomes No. 2 by the increment in step S205 and thus the concerned application F is looked up as the object application.

Figure 5:
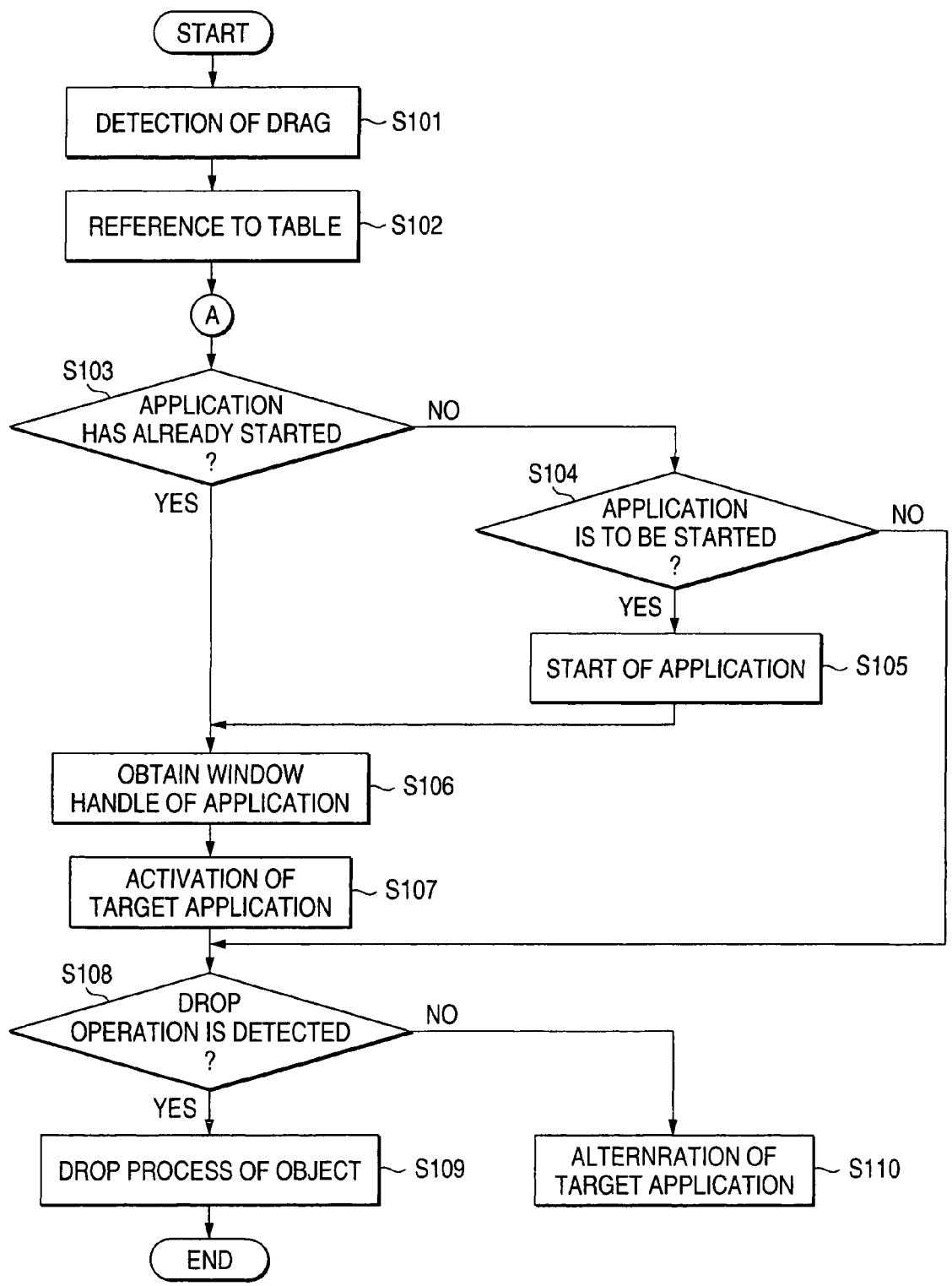
FIG. 5 is a flowchart showing a process of executing a drag-and-drop operating method according to the embodiment of the present invention.
Figure 6:
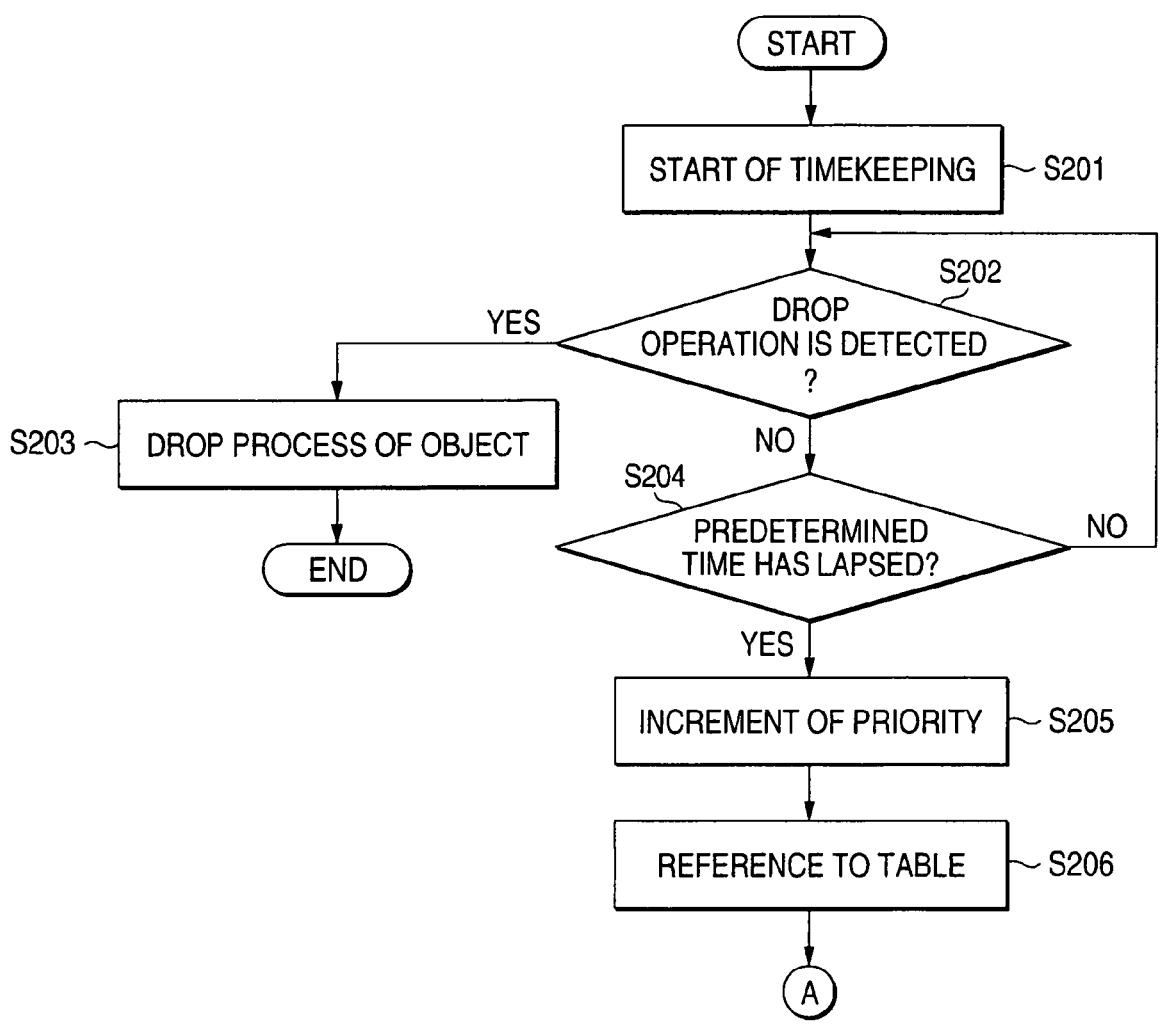
FIG. 6 is a flowchart showing a process of executing the drag-and-drop operating method according to the embodiment of the present invention (a process of changing the application that is to be displayed on the foremost side).
Figure 8A:
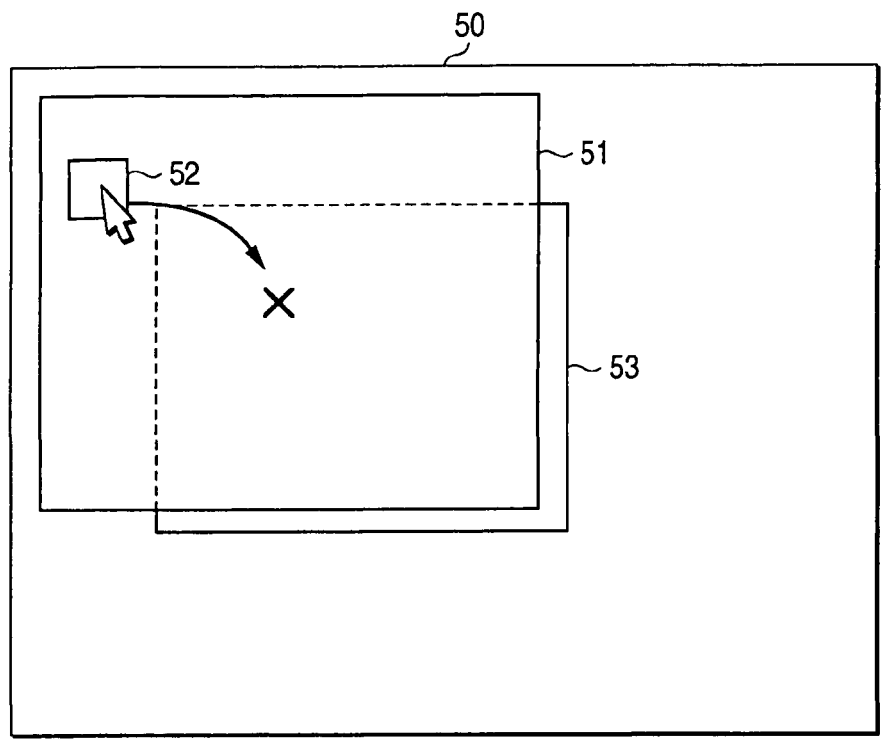
FIGS. 8A and 8B are schematic views showing the subject of the drag-and-drop operation in the prior art (an example in which the window as the destination of drop is concealed)
Figure 8B:
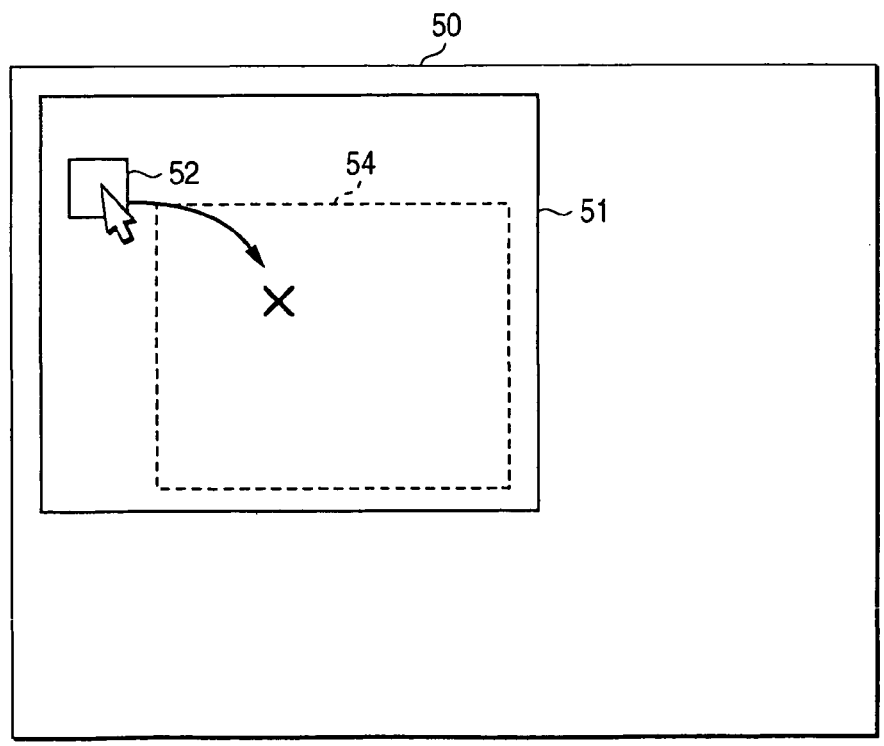
Figure 9A:
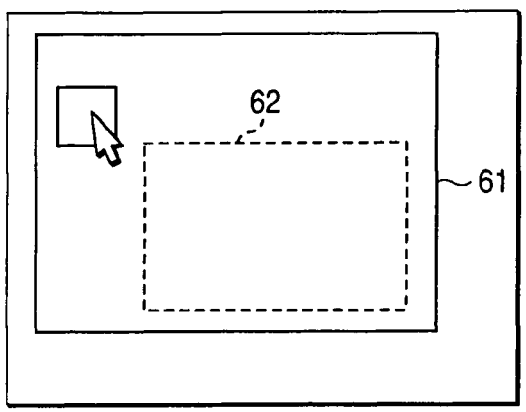
FIGS. 9A, 9B, 9C, and 9D are schematic views showing the subject of the drag-and-drop operation in the prior art (operating procedures of the process prior to the execution of the drag-and-drop operation).
Figure 9B:
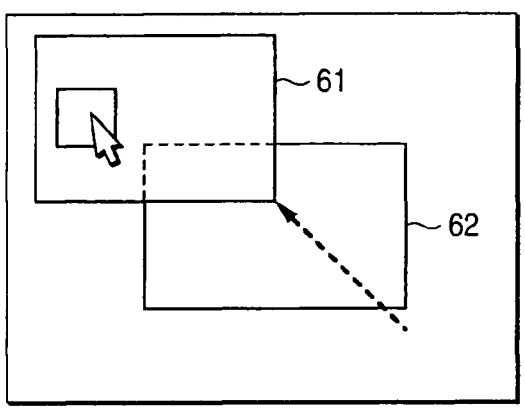
Figure 9C:
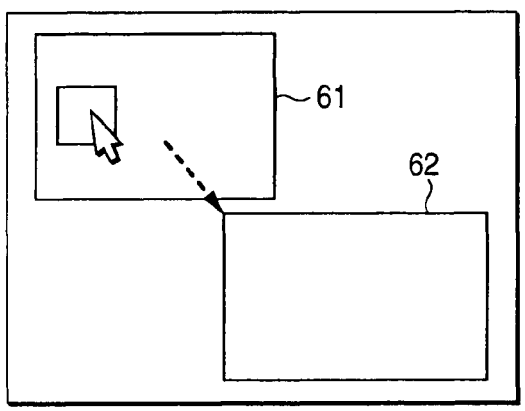
Figure 9D:
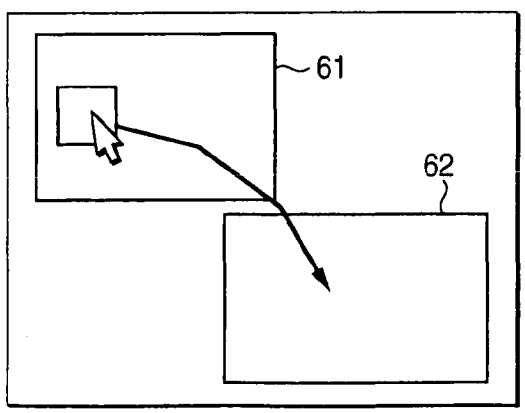

After the above changing process has been applied, the process is returned to the step shown by "A" in FIG. 5. Then, the process of displaying the window of the object application on the foremost side is carried out according to above procedures. The explanation will be made by using the example in FIG. 7B. If the application F having the second priority is not started, the window of the application F is displayed on the foremost side in the order of steps S104, S105, S106, and S107. Then, if the drag operation is still maintained, the application G having the third priority and the application Q having the fourth priority are displayed sequentially on the foremost side according to the similar procedures. Then, if the drag operation is maintained much more, the priority is also incremented but the priority goes back to No. 1 once again to circulate since the priority is given up to No. 4. If the operator executes the drop operation when the window of the desired application is displayed on the foremost side, the drag-and-drop operation can be completed.

The above procedures are the procedures of the drag-and-drop operation. Then, assignment of the priority of the application in the reference table will be explained hereunder. As described above, a plurality of applications can be assigned to the reference table as the application as the destination of drop of the dragged object. The assignment to the table may be set such that the operator can designate directly the application, otherwise the application may be assigned automatically based on the drag-and-drop operation history of the object of the concerned application (or in the operation mode).

As an example of the case that the application is assigned based on the operation history, there is the approach of saving the past operation history by the designated number of times in the table and then canceling sequentially the data in the history data from the oldest data every time when the operation is carried out. If the new operation is carried out, the application as the destination of drop is set as the application having the first priority. Then, if the operation is still carried out, the numeral of the first priority of the application is incremented to the second priority. In addition to such assignment method, various well-known approaches may be employed.

In this case, it is needless to say that the window of the application explained up to now contains not only the window of the normal application but also the window environment provided by the OS (Operating System) (e.g., the windows displayed by Microsoft Windows® "my computer" and "my document", etc.) and that the present invention can also be applied to them.

Figure 10A:
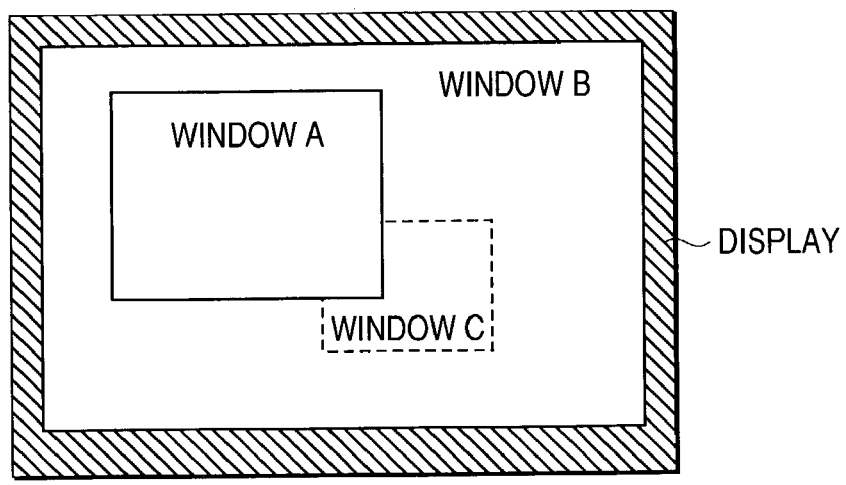
FIGS. 10A, 10B, and 10C are schematic views showing acceptable examples of the drag-and-drop operation in the present invention.
Figure 10B:
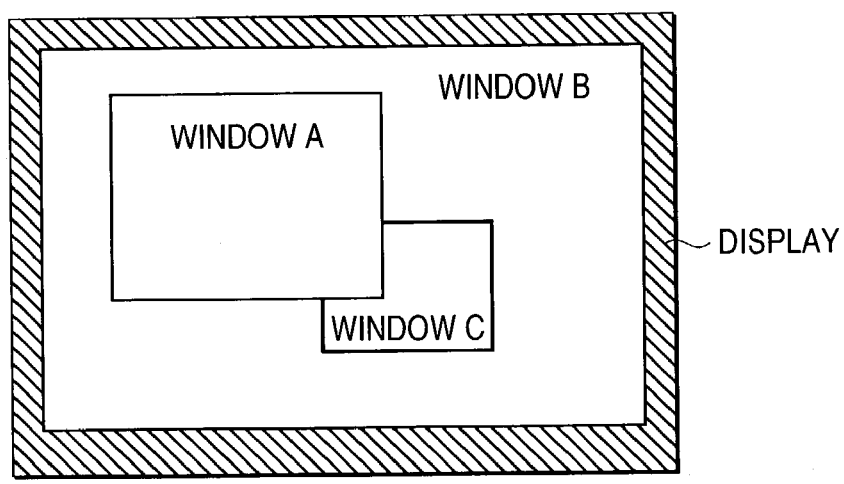

In the above-described embodiments, the concealed window corresponding to the predetermined application is displayed on the foremost and the predetermined application is activated. However, it is an adequate situation for the activation of the predetermined application that at least a part of the concealed window can be invisible. For example, as shown in FIG. 10A, there are window A, window B and window C on a desktop. The window B conceals the whole window C. The window A is displayed on the window B. In this situation, by dropping to the window C, the whole concealed window C is not displayed on the foremost but at least a part of the window C is displayed on the window B (See FIG. 10B). It is also possible to activate application C corresponding to the window C without displaying it on the foremost.

Figure 10C:
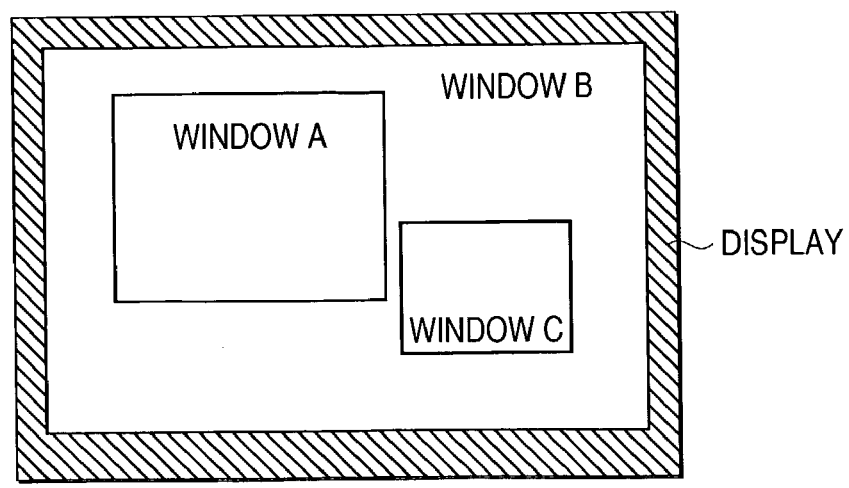

Furthermore, it is acceptable situation that both of the window C and the window A are displayed on the window B with same level, after dropping the window C (See FIG. 10C).

As described above, according to the inventions, even if the window as the destination of drop is concealed on the desktop prior to the start of the drag, the window of the application, which receives the drag, can be displayed on the foremost side of the desktop at a point of time when the drag is started. Thus, the operator can drop easily the object in the window as the destination of drop.

Also, according to the inventions, if the application that receives the drag is not started at a point of time when the drag is started, the concerned application can be started automatically and the window can be displayed on the foremost side. Thus, the operator can drop easily the object not to execute newly the starting operation of the application.

Also, according to the inventions, if a plurality of applications that can receive the drag are present, the concerned application can be displayed on the foremost side or can be started and then displayed on the foremost side by referring to the table that indicates the association between the objects and the applications and their priorities. Thus, the operator can decide easily the destination of drop of the object.

Also, according to the inventions, if a plurality of applications that can receive the drag are present, the window that is to be displayed on the foremost side can be altered/circulated sequentially in compliance with the priority in the reference table until the drop operation is carried out. Thus, the operator can select easily the destination of drop of the object.

What is claimed is:

1. A display control method for displaying a concealed window on a desktop when an object displayed in one window in a multitask window environment is dragged by a pointing device and then dropped in another window, the method comprising the steps of:
   detecting start of a drag operation; and
   activating, in response to the detection of the drag operation, a predetermined application associated with the dragged object as a destination for the drop of the dragged object by displaying a concealed window, which corresponds to the predetermined application, on a foremost layer of the multi-window environment,
   wherein the association between the dragged object and the predetermined application is predetermined by a reference table prior to detecting start of the drag operation;
   said activating step referring to the reference table, the reference table indicating the association between the object and predetermined applications and priorities of predetermined applications, to determine which of predetermined applications has priority for the object such that the predetermined application with priority for the object is displayed on the foremost layer,
   wherein each of the predetermined applications have a plurality of modes and the object has one of a plurality of types, the reference table indicating the association between the object, the object type, modes of the predetermined applications, and priorities of the predetermined applications for each mode and type.

2. A display control method for displaying a concealed window on a desktop when an object displayed in one window in a multitask window environment is dragged by a pointing device and then dropped in another window, the method comprising the steps of:
   detecting start of a drag operation;
   detecting whether or not a predetermined application associated as the destination for the drop of the dragged object has been started;
   activating the predetermined application by displaying a concealed window corresponding to the predetermined application on a foremost layer of the multi-window environment if the predetermined application has been started; and
   starting the predetermined application in a window on the foremost layer of the multi-window environment if the predetermined application has not been started, wherein the association between the dragged object and the predetermined by a reference table application is predetermined prior to detecting start of the drag operation;
   said activating step referring to the reference table, the reference table indicating the association between the object and predetermined applications and priorities of predetermined applications, to determine which of the predetermined applications has priority for the object such that the predetermined application with priority for the object is displayed on the foremost layer,
   wherein each of the predetermined applications have a plurality of modes and the object has one of a plurality of types, the reference table indicating the association between the object, the object type, modes of the predetermined applications, and priorities of the predetermined applications for each mode and type.

3. The display control method according to claim 1, further comprising the step of:
   displaying concealed windows, associated with the plurality of the predetermined applications, sequentially on the foremost layer of the multi-window environment in compliance with the priorities in the reference table while the drag operation is held, and then repeating the display until a drop operation is carried out.

4. The display control method according to claim 2, further comprising the step of:
   displaying concealed windows, associated with the plurality of predetermined applications, sequentially on the foremost layer of the multi-window environment in compliance with the priorities in the reference table while the drag operation is held, and then repeating the display until a drop operation is carried out.

5. A display control method for displaying a concealed window on a desktop when an object displayed in one window in a multitask window environment is dragged by a pointing device and then dropped in another window, the method comprising the steps of:
  detecting start of a drag operation; and
  activating an application, in response to the detection of the drag operation starting, that automatically activates a predetermined application as a destination for the drop of the dragged object by displaying a concealed window corresponding to the predetermined application on a screen such that at least a part of the concealed window is visible under a multi-window environment, wherein the association between the dragged object and the predetermined application is predetermined prior to detecting start of the drag operation;
  said activating step referring to the reference table, the reference table indicating the association between the object and predetermined applications and priorities of predetermined applications, to determine which of predetermined applications has priority for the object such that the predetermined application with priority for the object is displayed on the foremost layer,
  wherein each of the predetermined applications have a plurality of modes and the object has one of a plurality of types, the reference table indicating the association between the object, the object type, modes of the predetermined applications, and priorities of the predetermined applications for each mode and type.

6. A display control method for displaying a concealed window on a desktop when an object displayed in one window in a multitask window environment is dragged by a pointing device and then dropped in another window, the method comprising the steps of:
  detecting start of a drag operation;
  detecting whether or not a predetermined application associated as a destination for the drop of the dragged object has been started;
  activating the predetermined application by displaying a concealed window corresponding to the predetermined application such that at least a part of the concealed window is visible under a multi-window environment if the predetermined application has been started and starting the predetermined application in a window such that at least a part of the window is visible if the predetermined application has not been started, wherein the association between the dragged object and the predetermined application is predetermined by a reference table prior to detecting start of the drag operation;
  said activating step referring to the reference table, the reference table indicating the association between the object and predetermined applications and priorities of predetermined applications, to determine which of the predetermined applications has priority for the object such that the predetermined application with priority for the object is displayed on the foremost layer,
  wherein each of the predetermined applications have a plurality of modes and the object has one of a plurality of types, the reference table indicating the association between the object, the object type, modes of the predetermined applications, and priorities of the predetermined applications for each mode and type.

7. A display control processing system for displaying a concealed window on a desktop when an object displayed in one window in a multitask window environment is dragged by a pointing device and then dropped in another window, the system comprising:
  a memory;
  a processor, the processor configured to:
  detect the start of a drag operation; and
  activate, in response to detection of the start of the drag operation, a predetermined application associated with the dragged object as a destination for the drop of the dragged object by displaying a concealed window corresponding to the predetermined application on a foremost layer of a multi-window environment, wherein the association between the dragged object and the predetermined application is predetermined by a reference table prior to detecting start of the drag operation; and
  a reference table in which the association between a plurality of predetermined applications and objects, and priorities are set;
  wherein the predetermined applications are the destinations of the drop of dragged objects, and
  wherein the processor is further configured to activate one of the predetermined applications by referring to the associations and the priorities in the reference table to determine which concealed window to display on the foremost layer of the multi-window environment, and
  wherein each of the predetermined applications have a plurality of modes and the object has one of a plurality of types, the reference table indicating the association between the object, the object type, modes of the predetermined applications, and priorities of the predetermined applications for each mode and type.

8. A display control processing system for displaying a concealed window on a desktop when an object displayed in one window in a multitask window environment is dragged by a pointing device and then dropped in another window, the system comprising:
  a memory; and
  a processor, the processor configured to:
  detect the start of a drag operation;
  determine whether or not a predetermined application associated as a destination for the drop of the dragged object has been started;
  display a concealed window corresponding to the predetermined application on a foremost layer of a multi-window environment if the predetermined application has been started; and
  start the predetermined application in a window on the foremost layer of the multi-window environment if the predetermined application has not been started, wherein the association between the dragged object and the predetermined application is predetermined by a reference table prior to detecting start of the drag operation further; and
  a reference table in which the association between a plurality of predetermined applications and objects, and priorities are set;
  wherein the predetermined applications are the destinations for the drop of dragged objects, and
  wherein the processor is further configured to activate one of the predetermined applications by referring to the associations and the priorities in the reference table to determine which concealed window to display on the foremost layer of the multi-window environment, and
  wherein each of the predetermined applications have a plurality of modes and the object has one of a plurality of types, the reference table indicating the association between the object, the object type, modes of the predetermined applications, and priorities of the predetermined applications for each mode and type.

9. The display control processing system according to claim 7,
wherein the processor is further configured to activate the plurality of predetermined applications by displaying windows associated with the plurality of predetermined applications sequentially on the foremost layer of the multi-window environment in compliance with the priorities in the reference table while the drag operation is held, and then repeating the activation until a drop operation is carried out.

10. The display control processing system according to claim 8,
wherein the processor is further configured to activate the plurality of predetermined applications by displaying windows associated with the plurality of predetermined applications sequentially on the foremost layer of the multi-window environment in compliance with the priorities in the reference table while the drag operation is held, and then repeating the activation until a drop operation is carried out.

11. A display control processing system for displaying a concealed window on a desktop when an object displayed in one window in a multitask window environment is dragged by a pointing device and then dropped in another window, the system comprising:
a memory; and
a processor, the processor configured to:
detect the start of a drag operation; and
activate, in response to detection of the start of the drag operation, a predetermined application as a destination for the drop of the dragged object by displaying a concealed window corresponding to the predetermined application on a screen such that at least a part of the concealed window is visible under a multi-window environment, wherein the association between the dragged object and the predetermined application is predetermined by a reference table prior to detecting start of the drag operation;
said activating step referring to the reference table, the reference table indicating the association between the object and predetermined applications and priorities of predetermined applications, to determine which of the predetermined applications has priority for the object such that the predetermined application with priority for the object is displayed on the foremost layer,
wherein each of the predetermined applications have a plurality of modes and the object has one of a plurality of types, the reference table indicating the association between the object, the object type, modes of the predetermined applications, and priorities of the predetermined applications for each mode and type.

12. A display control processing system for displaying a concealed window on a desktop when an object displayed in one window in a multitask window environment is dragged by a pointing device and then dropped in another window, the system comprising:
a memory; and
a processor, the processor configured to:
detect the start of a drag operation;
determine whether or not a predetermined application associated as a destination for the drop of a the dragged object has been started;
display a concealed window corresponding to the predetermined application under a multi-window environment if the predetermined application has been started; and start the predetermined application in a window under the multi-window environment if the predetermined application has not been started, wherein the association between the dragged object and the predetermined application is predetermined by the reference table prior to detecting start of the drag operation;
said starting step referring to the reference table, the reference table indicating the association between the object and predetermined applications and priorities of predetermined applications, to determine which of the predetermined applications has priority for the object such that the predetermined application with priority for the object is displayed on the foremost layer,
wherein each of the predetermined applications have a plurality of modes and the object has one of a plurality of types, the reference table indicating the association between the object, the object type, modes of the predetermined applications, and priorities of the predetermined applications for each mode and type.

13. A program stored on a memory for displaying and controlling a concealed window on a desktop when an object displayed in one window in a multitask window environment is dragged by a pointing device and then dropped in another window, the program for causing a computer to execute a method comprising: detecting start of a drag operation; and activating, in response to detection of the start of the drag operation, a predetermined application associated with the dragged object as a destination for the drop of the dragged object by displaying a concealed window corresponding to the predetermined application on a foremost layer of a multi-window environment, wherein the association between the dragged object and the predetermined application is predetermined by a reference table prior to detecting start of the drag operation; said activating step referring to the reference table, the reference table indicating the association between the object and predetermined applications and priorities of predetermined applications, to determine which of predetermined applications has priority for the object such that the predetermined application with priority for the object is displayed on the foremost layer wherein each of the predetermined applications have a plurality of modes and the object has one of a plurality of types, the reference table indicating the association between the object, the object type, modes of the predetermined applications, and priorities of the predetermined applications for each mode and type.

14. A program stored on a memory for displaying and controlling a concealed window on a desktop when an object displayed in one window in a multitask window environment is dragged by a pointing device and then dropped in another window, the program for causing a computer to execute a method comprising: detecting start of a drag operation; determining whether or not a predetermined application associated as a destination for the drop of a the dragged object has been started; activating the predetermined application by displaying a concealed window corresponding to the predetermined application on a foremost layer of a multi-window environment if the predetermined application has been started; and starting the predetermined application in a window on the foremost layer of the multi-window environment if the predetermined application has not been started, wherein the association between the dragged object and the predetermined application is predetermined by a reference table prior to detecting start of the drag operation; said activating step referring to the reference table, the reference table indicating the association between the object and predetermined applications and priorities of the predetermined applications, to determine which of the predetermined applications has priority for the object such that the predetermined application with priority for the object is displayed on the foremost layer wherein each of the predetermined applications have a plurality of modes and the object has one of a plurality of types, the reference table indicating the association between the object, the object type, modes of the predetermined applications, and priorities of the predetermined applications for each mode and type.

15. The program according to claim 13, comprising:
activating the plurality of the predetermined applications by displaying windows, associated with the plurality of predetermined applications, sequentially on the foremost layer of the multi-window environment in compliance with the priorities and repeating the activation until a drop operation is carried out.

16. The program according to claim 14, further comprising:
activating the plurality of the predetermined applications by displaying windows, associated with the plurality of predetermined applications, sequentially on the foremost layer of the multi-window environment in compliance with the priorities and repeating the activation until a drop operation is carried out.

17. A program stored on a memory for displaying and controlling a concealed window on a desktop when an object displayed in one window in a multitask window environment is dragged by a pointing device and then dropped in another window, the program for causing a computer to execute a method comprising: detecting start of a drag operation; and activating, in response to detection of the drag operation starting, a predetermined application as a destination for the drop of the dragged object by displaying a concealed window corresponding to the predetermined application such that at least a part of the concealed window is visible under a multi-window environment, wherein the association between the dragged object and the predetermined application is predetermined by a reference table prior to detecting start of the drag operation; said activating step referring to the reference table, the reference table indicating the association between the object and predetermined applications and priorities of predetermined applications, to determine which of the predetermined applications has priority for the object such that the predetermined application with priority for the object is displayed on the foremost layer, wherein each of the predetermined applications have a plurality of modes and the object has one of a plurality of types, the reference table indicating the association between the object, the object type, modes of the predetermined applications, and priorities of the predetermined applications for each mode and type.

18. A program stored on a memory for displaying and controlling a concealed window on a desktop when an object displayed in one window in a multitask window environment is dragged by a pointing device and then dropped in another window, the program for causing a computer to execute a method comprising: detecting start of a drag operation; determining whether or not a predetermined application associated as a destination for the drop of a the dragged object has been started; activating the predetermined application by displaying a concealed window corresponding to the predetermined application such that at least a part of the concealed window is visible under a multi-window environment if the predetermined application has been started; and starting the predetermined application in a window such that at least a part of the concealed window is visible under the multi-window environment if the predetermined application has not been started, wherein the association between the dragged object and the predetermined application is predetermined by a reference table prior to detecting start of the drag operation; said activating step referring to the reference table, the reference table indicating the association between the object and predetermined applications and priorities of predetermined applications, to determine which of the predetermined applications has priority for the object such that the predetermined application with priority for the object is displayed on the foremost layer, wherein each of the predetermined applications have a plurality of modes and the object has one of a plurality of types, the reference table indicating the association between the object, the object type, modes of the predetermined applications, and priorities of the predetermined applications for each mode and type.

* * * * *